United States Patent [19]
Keller

[11] Patent Number: 5,853,049
[45] Date of Patent: Dec. 29, 1998

[54] HORIZONTAL DRILLING METHOD AND APPARATUS

[76] Inventor: Carl E. Keller, P.O. Box 9827, Santa Fe, N. Mex. 87504

[21] Appl. No.: 807,028

[22] Filed: Feb. 26, 1997

[51] Int. Cl.[6] .................................................. E21B 19/16
[52] U.S. Cl. ............................................ 166/380; 156/287
[58] Field of Search ................................ 166/228, 278, 166/51, 64, 378, 380; 175/226; 156/294, 287

[56] References Cited

U.S. PATENT DOCUMENTS

| | | | |
|---|---|---|---|
| 4,325,772 | 4/1982 | Suetoshi et al. | 156/294 |
| 4,581,247 | 4/1986 | Wood | 156/508 |
| 4,602,974 | 7/1986 | Wood et al. | 156/287 |
| 4,680,066 | 7/1987 | Wood | 156/156 |
| 5,309,994 | 5/1994 | Douglas et al. | 166/278 |

Primary Examiner—Frank Tsay
Attorney, Agent, or Firm—Ray G. Wilson

[57] ABSTRACT

An inverting liner system is used for installing a casing in a borehole without the need for drilling mud. The liner system includes a first portion with a diameter effective for supporting walls of said borehole and a second portion having a first end fixed to the liner portion at a point of attachment and a second distal end. The second liner portion has a diameter effective for surrounding the casing and inverting the casing within the first liner portion. A third liner portion has one end attached to the point of attachment of the first and second liner portions and a second end releasably attached to the distal end of the second liner portion during installation of the casing in the borehole. When casing installation is complete, the third liner portion is released from the second liner portion and the third liner portion may be withdrawn from the borehole, thereby inverting the first and second liner portions from about the casing and from within the borehole. In a particular embodiment, the casing and liner assembly are inverted within a canister for transportation and storage at a drilling site.

10 Claims, 5 Drawing Sheets

HORIZONTAL DRILLING METHOD AND APPARATUS

BACKGROUND OF THE INVENTION

This invention relates to drilling horizontal bore holes, and, more particularly, to stabilizing horizontal borehole walls.

Many uses arise for horizontal bore holes, particularly in the field of environmental remediation where a geologic structure must be followed for contaminant monitoring and removal. There are several considerations relative to drilling horizontal bore holes. A first consideration is forming the bore hole itself, i.e., drilling the passage through the earth A second consideration is the support of the bore hole walls. Next, as the hole is drilled, the bore hole cuttings must be removed from the bore hole. The final consideration is the installation of a casing and a well screen within the bore hole.

In conventional drilling, a drilling mud is circulated around a drill bit in order to flush the cuttings from the drill from the hole. The drilling mud is commonly formed of a composition that will form a mud cake on the bore hole wall and support the bore hole wall against collapse. Drilling mud exerts pressure against the mud cake, which then supports the wall. If the drilling mud cannot support the hole wall, the walls will collapse and greatly impede emplacement of the casing and any well screen provided with the casing. The drilling mud may also serve as a lubricant during installation of the casing and well screen, but the casing and screen can experience significant drag forces during installation that can deform and damage the screen.

In drilling horizontal holes for remediation of contaminated geologic formations, however, the drilling mud acts to plug the pore space of the formation. The plugging effect of the drilling mud drastically reduces the permeability of the geologic formation to fluid flow into or out of the hole. The plugging effect is especially pronounced in loosely consolidated sands and gravel that are often the preferred flow paths of contaminates in the geologic structure.

It will also be appreciated that the drilling muds that effectively support the bore hole walls also circulate very slowly in large diameter bore holes. This slow circulation velocity reduces the effectiveness of the drilling mud to remove the drill cuttings from the bore hole.

One approach to replacing drilling muds for use in placing a casing in horizontal bore holes is described in patent application Ser. No. 08/769,656, Horizontal Drilling Method and Apparatus, filed Dec. 19, 1996, incorporated herein by reference, where bore hole support is provided by an everting flexible bore hole liner during installation of a casing and well screen. As described therein, the liner is inverted from around the casing after the casing is in place. In order to release the liner from the casing a fluid is introduced between the casing and the liner to reduce friction as the liner is inverted. Introduction of the fluid may require an additional liner within the casing and does require additional steps and equipment for introducing and removing the fluid from between the casing and the liner.

In addition to the complexity of introducing fluids, room is required at both ends of the horizontal borehole to provide the everting/inverting flexible liner system on one end and an extended casing at the other end. Each of the components must be handled separately and may require two or more contractors for the component parts.

Accordingly, it is an object of the present invention to provide an everting/inverting liner system for use in placing a casing within a borehole that is readily removable from about the casing.

It is another object of the present invention to minimize the process steps for removing an everting/inverting liner that is used to install a horizontal casing within a borehole.

Yet another object of the present invention is to provide an everting/inverting liner system that includes a casing assembly as an integral part of the system.

One other object of the present invention is to eliminate the need for a water flow to reduce forces between an everting/inverting liner and a borehole casing during removal of the liner from about the casing.

Still another object of the present invention is to permit an assembled liner/casing system to be simply provided at a borehole for installation of the casing.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise an everting liner system for installing a casing in a borehole. The liner system includes a first portion with a diameter effective for supporting walls of said borehole and a second portion having a first end fixed to the liner portion at a point of attachment and a second distal end. The second liner portion has a diameter effective for surrounding the casing. A third liner portion has one end attached to the point of attachment of the first and second liner portions and a second end releasably attached to the distal end of the second liner portion. In a particular embodiment, the casing and liner assembly are everted within a canister for transportation and storage at a drilling site.

In another characterization of the invention, a method is provided for installing a casing in a borehole without the use of drilling mud. The casing is inverted within a liner assembly into a canister. At the location of the borehole, the liner is everted with said casing through the borehole. The liner assembly is then inverted from the borehole and from about the casing.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1:
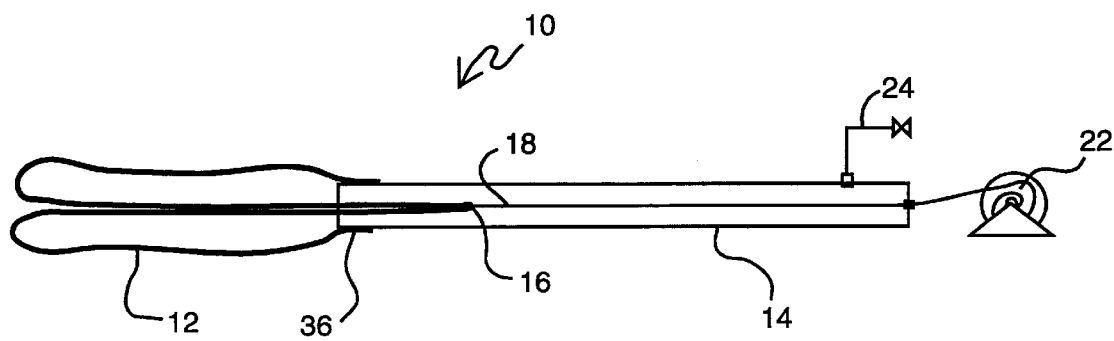
FIG. 1 is a cross-section of a conventional everting/inverting liner system.

U.S. patent application 08/769,656, Horizontal Drilling Method and Apparatus, filed Dec. 19, 1996, incorporated herein by reference, describes the use of an everting/inverting flexible liner to replace drilling mud during completion of a horizontal borehole and installation of a casing and well screen assembly in the borehole. As shown in FIG. 1, a suitable flexible bore hole liner system 10 is formed from a flexible liner 12 sealed at a tether attachment end 16 and attached to an enclosing hose canister 14 at securing end 36 of flexible liner 12. In an exemplary embodiment, flexible liner 12 is inverted within canister 14 by winding cord-like tether member 18 onto reel 22. In some embodiments, a valve system 24 may be included for pressurizing the interior of liner 12 to evert the liner and for relieving pressure from within the interior of liner 12 when inverting liner 12. Everting liner systems are well known and are not, per se, the subject of the present invention. Everting liner systems are shown in U.S. Pat. Nos. 5,176,207, issued Jan. 5, 1993; 5,377,754, issued Jan. 3, 1995; and 5,466,093, issued Nov. 14, 1995, all incorporated herein by reference. As used herein, the term liner will refer to everting/inverting tubular members for use in boreholes.

Figure 2:
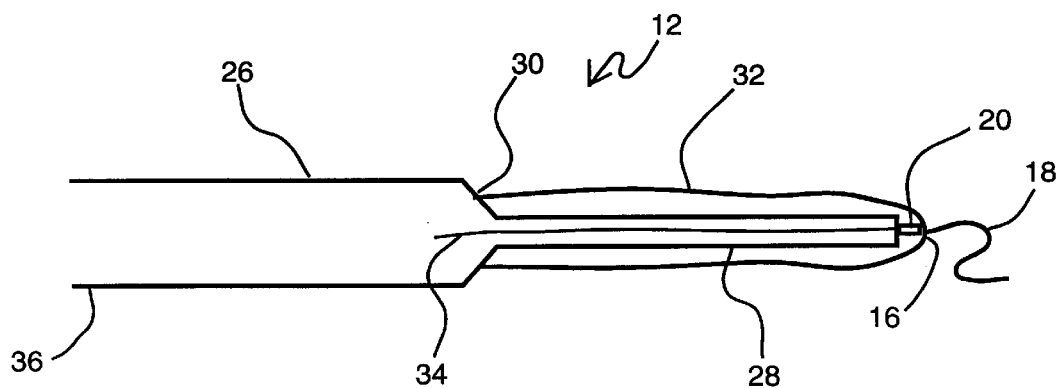
FIG. 2 is a cross-section of an everting/inverting liner assembly according to the present invention.

In accordance with the present invention, a three-part liner assembly 12 is provided as shown in FIG. 2. A first liner portion 26 is sized to expand against a borehole wall to support the wall during casing installation and further includes a securing end 36 for attaching to an installation canister 14 (FIG. 1). A second liner portion 28 is sized to surround the casing to be installed in the borehole. A third liner portion 32 is installed about second liner portion 28 and acts as a pull tube for removing second liner portion 28 from about the casing and first liner portion 26 from the borehole, as discussed below. As shown in FIG. 2, first liner portion 26 may be larger in diameter than second liner portion 28 in a preferred embodiment, but the portions may be the same diameter, depending on the relative diameter of the borehole and the casing First liner portion 26, second liner portion 28, and third liner portion 32 are joined at a location 30 and each liner portion is at least the length of the casing that is to be installed in a borehole. First liner portion 26 and second liner portion 28 are preferably constructed of a relatively heavy and water tight material, such as a heavy plastic or coated fabric, to provide for the use of water or air pressure to evert the liners during casing installation and to withstand friction forces from the casing and the borehole as the liner is inverted after the casing is installed. Third liner portion 32 is not required to be water tight and may be formed as a continuous tubular member or may be a plurality of material strips arranged about second liner portion 28. Third liner portion 32 is further connected to second liner portion 28 through a releasable attachment 20 that can be actuated by pulling pull cord 34. Tether 18 is also attached to third liner portion 32 and is provided for towing third liner portion 32 to invert first liner portion 26 and second liner portion 28.

Figure 3:
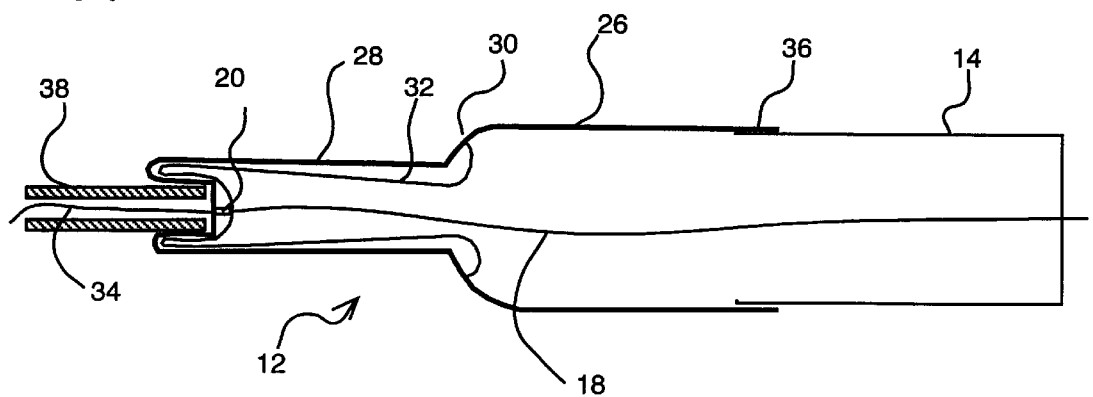
FIG. 3 a cross-section of a borehole casing being placed within a liner assembly as shown in FIG. 2.

FIG. 3 depicts liner assembly 12 attached to canister 14 at securing end 36 where liner assembly 12 has been everted from canister 14 with tether 18 extending through canister 14 to a reel or the like (not shown). Casing 38 is inserted within second liner portion 28 so that everted liner assembly 12 may be pressurized so that second liner portion 28 grips casing 38. Pull cord 34 extends through casing 38 for releasable connector 20 after casing emplacement.

Figure 4:
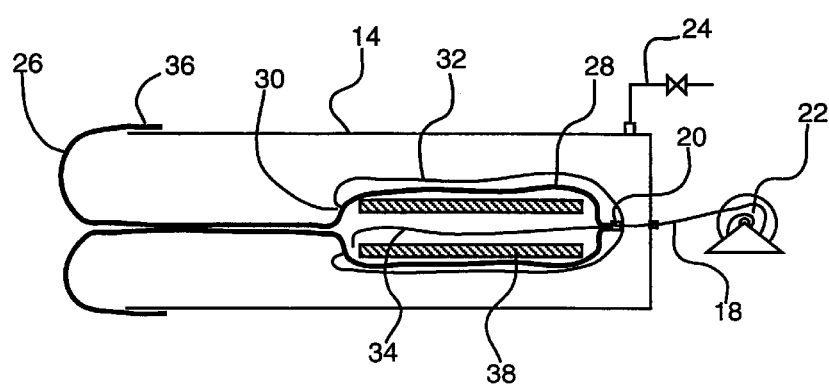
FIG. 4 is a cross-section of a casing prepared for installation in a borehole with an everting/inverting liner system according to the present invention.

FIG. 4 depicts casing 38 fully installed in canister 14. In a significant aspect of this invention, the installation may be done away from a drill site and transported fully assembled to the drill site. Where casing 38 and canister 14 are sufficiently flexible, the entire assembly may be simply reeled onto a large diameter reel for storage and transportation. The entire liner assembly 12 (FIG. 3) is inverted within canister 14 so that second liner portion 28 surrounds and grips casing 38. First liner portion 26 is secured to canister 14 at attachment 36 and inverted within canister 14. Third liner portion 32 surrounds second liner portion 28 with attached tether 18 wound onto reel 22, or the like, and pull cord 34 extending from releasable connector 20 through casing 38. Pressurizing attachment 24 is attached to canister 14 to introduce a pressurizing liquid or gas for everting the liner portions into a borehole to transport casing 38 through the borehole.

Figure 5:
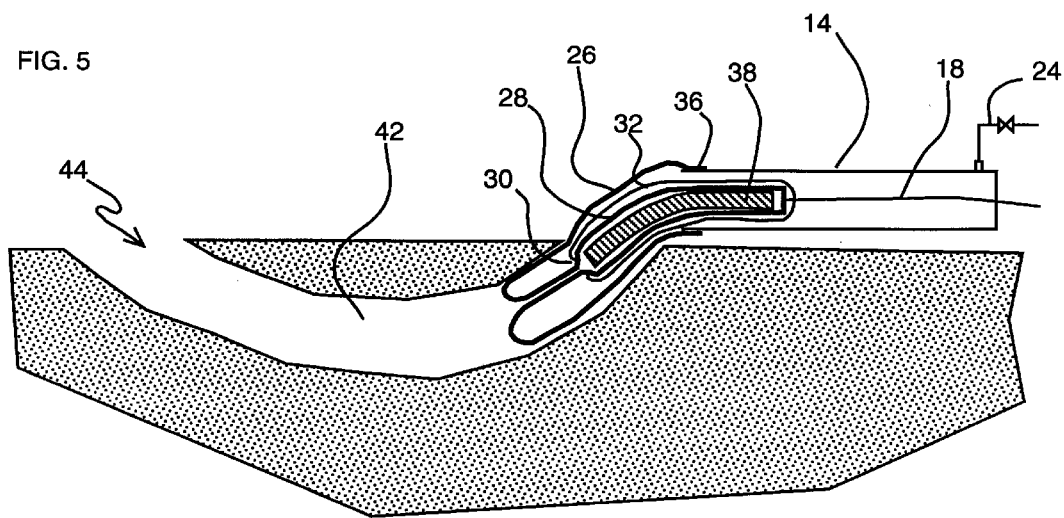
FIG. 5 depicts the introduction of a casing into a horizontal borehole using the everting/inverting liner system of the present invention.
Figure 6:
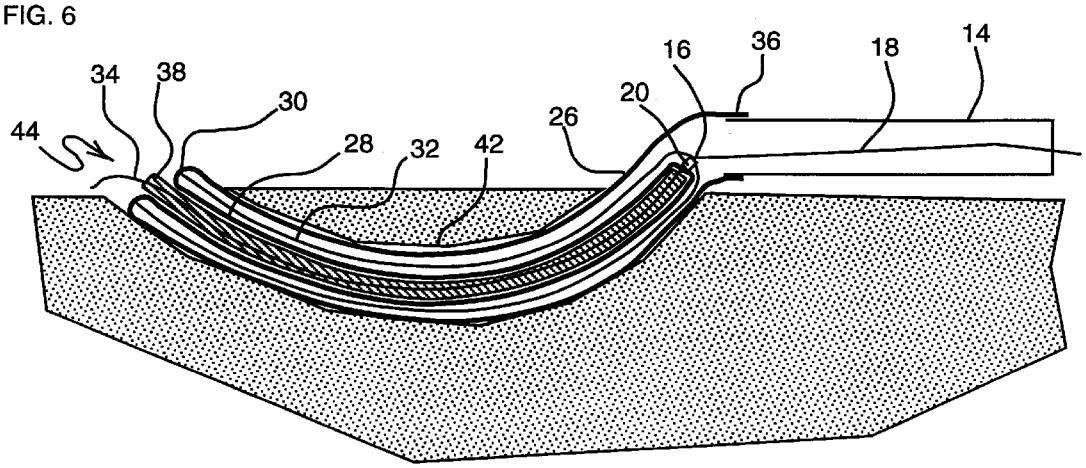
FIG. 6 depicts a casing that is completely installed in a horizontal borehole using the everting/inverting liner system of the present invention.

FIGS. 5 and 6 further depict the installation of a casing in a horizontal borehole in accordance with the present invention. The casing/everting liner assembly is placed adjacent a horizontal borehole 42, where the end of canister 14 is placed for entry of the everting liner into borehole 42. A pressurizing fluid is introduced through pressurizing attachment 24 to cause first liner portion 26 to evert into borehole 42. The eversion of first liner portion 26 pulls second liner portion 28 and casing 38 gripped therein and third liner portion 32 into borehole 42. Tether 18 unreels as the liner assembly is everted.

When the liner assembly is fully everted, as shown in FIG. 6, casing 38 extends through borehole exit 44, with pull cord 34 accessible from exit 44. Liner attachment junction 30 is just visible at exit 44 to indicate that the liner assembly is fully everted. Pull cord 34 is now pulled to release third liner portion 32 from second liner portion 28 at releasable connection 20 so that third liner portion 32 may now be moved independently from second liner portion 28. When tether 18 is reeled onto reel 22 (FIG. 4), liner 32 is drawn toward canister 14.

Figure 7:
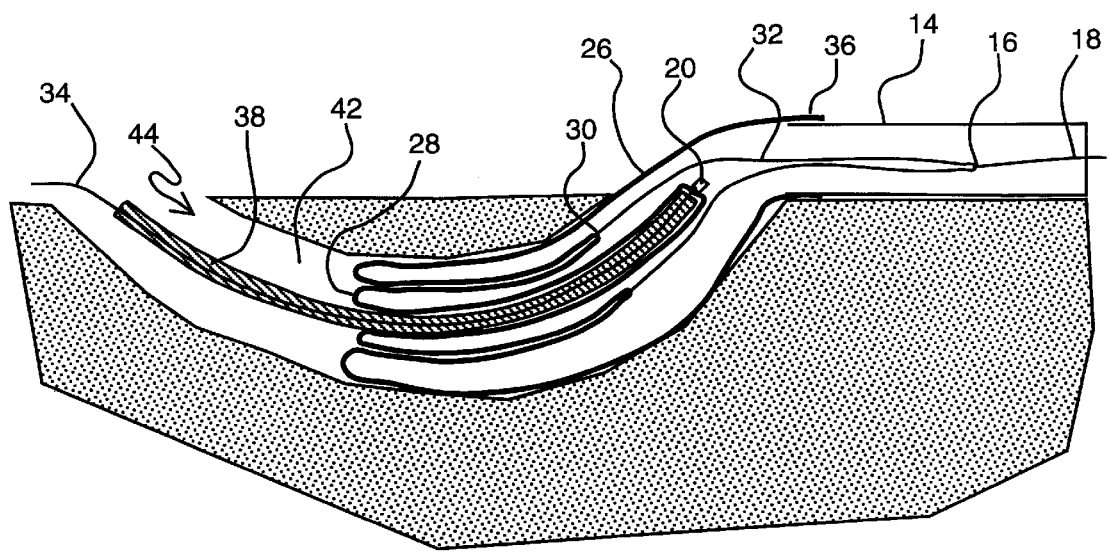
FIG. 7 depicts the everting/inverting liner of the present invention being removed from about an installed casing in a horizontal borehole.

As shown in FIG. 7, the withdrawal of third liner portion 32 acts to move liner junction 30 toward canister 14 with concomitant movement of second liner portion 28 from about casing 38 and first liner portion 26 from within borehole 42. The pressurizing fluid within the liner assembly acts to reduce friction between adjacent liner components during the inversion of the liner assembly. The entire liner assembly is thus inverted back into canister 14. Casing 38 may be secured at borehole exit 44 to prevent any retraction of casing 38 as the liner assembly is inverted. Pull cord 34 is simply removed from within casing 38 to complete the installation of casing 38 within borehole 42. The geologic material surrounding casing 38 may simply collapse around casing 38 as borehole support liner 26 is inverted.

Figure 8:
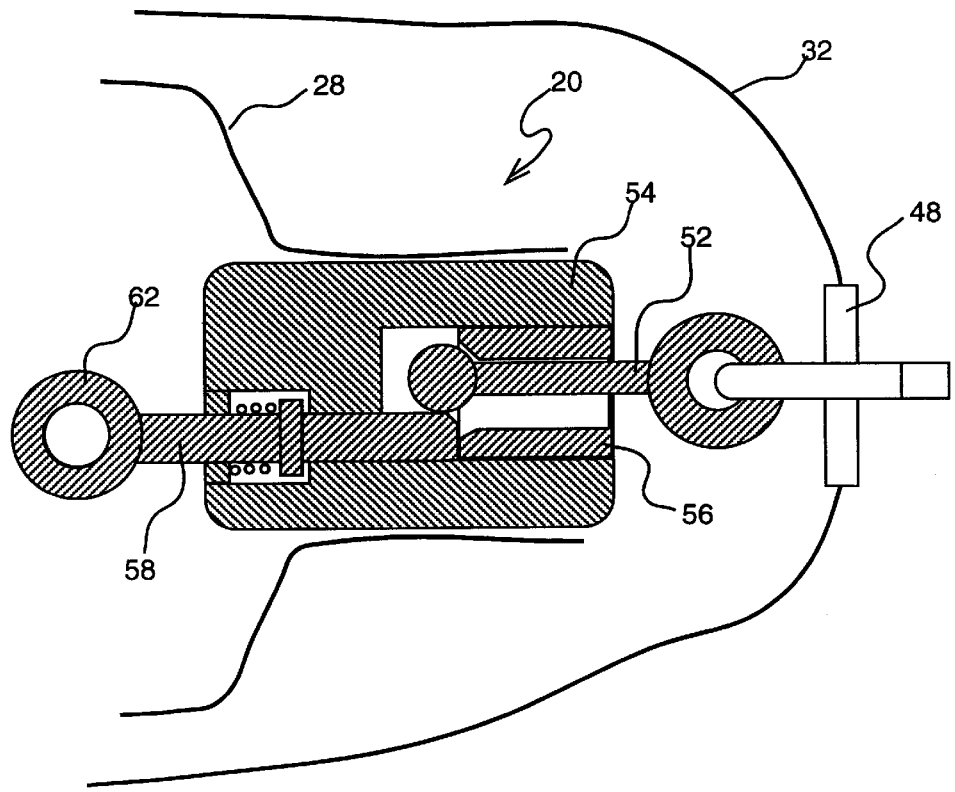
FIG. 8 is a cross-section of an exemplary release mechanism for use in liner removal from the borehole.

It will be appreciated that releasable connection 20 may be formed in a number of conventional configurations since pull and release mechanisms are well known. An exemplary releasable connection 20 is shown in FIG. 8. Tether connector 48 is fastened by third liner portion 32 by clamping, by adhesive, or other suitable fastening technique and provides for attaching tether 18 (see, e.g., FIG. 2) to third liner portion 32. Catch 52 is attached to tether connector 48 by any convenient means, such as an eyelet as shown in FIG. 8. Catch 52 is received within insert 56 in connector body 54.

Pull cord connector 62 is attached to pull cord 34 (see, e.g., FIG. 2) and mounted on spring loaded latch 58, which acts on catch 52 to hold catch 52 within insert 56. In one embodiment, insert 56 is beveled to receive and hold catch 52. Then, simply pulling pull cord 34 will retract spring loaded latch 58 to release catch 52 from within insert 56 so that third liner portion 32 is released from second liner portion 38 for removing the liner assembly from the borehole, as discussed above.

Figure 9:
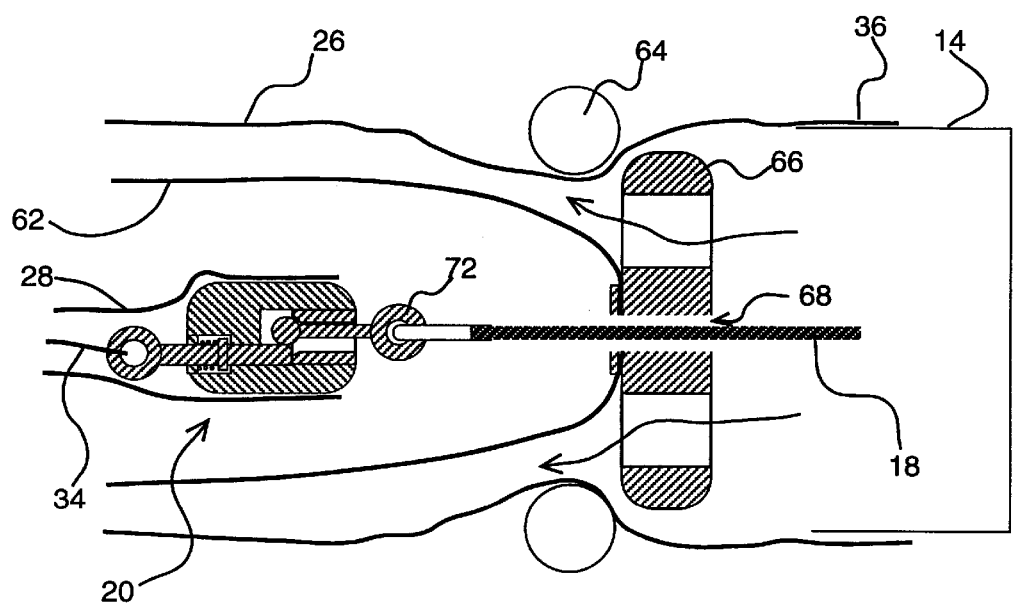
FIG. 9 is a cross section of an arrangement between liner portions to control liner eversion.

In some instances, a casing is installed in the liner in the field. In that instance, it is desirable to evert the second liner portion independent of the third liner portion. FIG. 9 is a cross-section of apparatus to enable this independent eversion of second liner portion 28 to accept the insertion of casing (not shown) for the purpose of loading the casing into second liner portion 28. Third liner portion 62 is held against extension by enlargement 66 attached to the end of third liner portion 62. As the liner system is extended from canister 14, enlargement 66 abuts against constricting ring 64 that is placed at a location around first liner portion 26 near end 36 attached to canister 14. The position of ring 64 is adjusted to allow junction 30 (FIG. 2) of the three liner portions to be exposed. Second liner portion 28 is then everted from within third liner portion 62 to accept the insertion of an end of the casing. Tether 18, connected to releasable connection 20, slides through tether passage 68 of enlargement 66 as second liner portion 28 is everted. Second liner portion 28 is then inverted by tether 18 to enclose the casing and to draw the casing into the interior of third liner portion 62.

When the casing is fully drawn into third liner portion 62, pull cord 34 can be pulled to release tether 18 from second liner portion 28. Eyelet 72 in the end of tether 18 then engages the end of third liner portion 62 since eyelet 72 is too large to pass through tether passage 68 in enlargement 66. Third liner portion 62 is then drawn by tether 18 from about second liner portion 28, causing second liner portion 28 to be everted from off the casing while first liner portion 26 is being inverted from out of the bore hole (see FIG. 7).

U.S. patent application 08/769,656, Horizontal Drilling Method and Apparatus, filed Dec. 19, 1996, further teaches the use of a liner to support the walls of a horizontal borehole as the hole is enlarged by reaming the hole. A liner simply follows the reamer through the pilot hole so that the walls are fully supported for casing installation. Using the apparatus of the present invention, the liner/casing assembly shown in FIG. 4 may be everted behind a reamer as taught in the application so that the casing installation is completed in one pass behind the reamer.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An everting liner system for installing a casing in a borehole, comprising:

a first liner portion having a diameter effective for supporting walls of said borehole;

a second liner portion having a first end fixed to said first liner portion at a point of attachment and a second distal end, and having a diameter effective for surrounding said casing; and a third liner portion having one end attached at said point of attachment of said first and second liner portions and a second end releasably attached to said distal end of said second liner portion.

2. An everting liner system according to claim 1, further including a tether attached to said second end of said third liner portion for inverting said first, second, and third liner portions.

3. An everting liner system according to claim 1, where said diameter of said first liner portion is greater than said diameter of said second liner portion.

4. An everting liner system according to claim 2, further including:

a reduced diameter portion of said first liner portion;

an enlargement portion attached to said second end of said third liner portion having a diameter greater than said reduced diameter portion of said first liner portion, said enlargement portion defining a tether passage therethrough to permit said distal end of said second liner portion to evert from within said first liner portion independent of said third liner portion when said enlargement portion is restrained by said reduced diameter portion of said first liner portion.

5. An everting liner system for installing a casing in a borehole, comprising:

a liner assembly comprising a first liner portion having a diameter effective for supporting walls of said borehole, a second liner portion having a first end fixed to said first liner portion at a point of attachment and a second distal end and having a diameter effective for gripping said casing; and a third liner portion having one end attached at said point of attachment of said first and second liner portions and a second end releasably attached to said distal end of said second liner portion;

a canister having a length effective to house said liner assembly and said casing when everted within said canister;

a casing inverted within said second liner portion and within said canister with said liner assembly.

6. An everting liner assembly according to claim 5, further including a tether attached to said second end of said third liner portion and extending within said canister for inverting said liner assembly within said canister.

7. An everting liner assembly according to claim 5, further including a releasable attachment joining said distal end of said second liner portion with said second end of said third liner portion.

8. A method for installing a casing in a borehole, comprising the steps of:

inverting said casing within a liner assembly;

pressurizing said liner assembly to grip said casing therein;

everting said liner assembly with said casing through said borehole; and inverting said liner assembly from within said borehole and from about said casing.

9. A method according to claim 8, wherein inverting said casing within said liner assembly further comprises the steps of:

everting from a first portion of said liner assembly a second portion of said liner assembly connected to and extending from said first portion of said liner assembly;

gripping said casing within said second portion of said liner assembly; and inverting said second portion of said liner assembly within said first portion of said liner assembly so that said casing is within said first and second portions of said liner assembly.

10. A method according to claim 9, wherein inverting said liner from within said borehole further comprises the steps of:

providing a third portion of said liner liner having one end connected to a junction of said first and second portions of said liner and releasably attached to a distal end of the second portion of said liner;

releasing said third portion of said liner from said distal portion of said second portion; and withdrawing said third portion to invert said connected first and second portions of said liner from about said casing.

* * * * *